United States Patent

Finkelstein et al.

[15] 3,639,108

[45] Feb. 1, 1972

[54] GASOLINE THICKENED WITH LATEX COMPOSITION

[72] Inventors: Leo Finkelstein, Aberdeen; John J. Blissel, Kingsville, both of Md.

[73] Assignee: The United States of America as represented by the Secretary of the Army

[22] Filed: Feb. 9, 1956

[21] Appl. No.: 564,586

[52] U.S. Cl. .................................................. 44/7 E, 44/7 D
[51] Int. Cl. ........................................................ C10l 7/02
[58] Field of Search.......................... 44/7, 7 D, 7 E; 52/23, 0.5, 52/5; 252/9.2 B; 260/722, 723, 739, 759

[56] References Cited

UNITED STATES PATENTS

| | | | |
|---|---|---|---|
| 2,530,493 | 11/1950 | Van Loenen | 52/0.5 |
| 2,722,099 | 11/1955 | Wasserbach | 52/0.5 |
| 701,459 | 12/1953 | British | 52/0.5 |
| 2,445,312 | 7/1948 | Cooke | 44/7 |
| 1,793,265 | 2/1931 | Twiss et al. | 260/820 |
| 2,037,423 | 4/1936 | Magill | 134/17 |

*Primary Examiner*—Leland A. Sebastian
*Attorney*—George Renehan and Edward J. Kelly

EXEMPLARY CLAIM

1. A flame thrower fuel consisting essentially of gasoline, natural rubber latex about .05 percent to 1.5 percent by weight of a nonionic surface active agent selected from the group consisting of polyoxyethylene sorbitan trioleate, polyoxyethylene sorbitan dioleate and polyoxyethylene sorbitan monooleate, and from 15 to 40 percent by weight of the said latex of a pour point depressant selected from the group consisting of ethylene glycol, glycerine and formamide said latex having not less than 60 percent by weight of rubber solids, in such quantity that the rubber solids content of the said fuel is 3 to 17 percent by weight.

1 Claims, No Drawings

GASOLINE THICKENED WITH LATEX COMPOSITION

The invention described herein may be manufactured and used by or for the Government of the United States of America for governmental purposes without the payment to us of any royalty thereon.

This invention relates to gelled or thickened liquid hydrocarbon fuels and improved gelling agents for that purpose. More particularly the invention is concerned with new gelling agents for production of improved gelled hydrocarbon liquid fuels for use in munitions.

According to the present invention a hydrocarbon liquid fuel such as petroleum gasoline may be thickened instantaneously by mixing certain liquid nonionic surface active agents, such as a polyoxyethylene sorbitan trioleate, with a liquid hydrocarbon and then adding a natural or synthetic rubber latex.

The term "natural rubber latex" is used to designate latices of the Hevea brasiliensis tree which have been preserved by formaldehyde and/or ammonia and concentrated by creaming and/or centrifuging or by other methods.

The term "Synthetic rubber latex" is used to designate products resulting from emulsion polymerization, preferably by "cold rubber" processes. Other emulsion polymerization latices i.e., those not made by "cold rubber" processes are usable, but definitely less desirable. Examples of satisfactory synthetic rubber latices are butadiene-styrene copolymer latices designated by the Federal Facilities Corporation, Office of Synthetic Rubber, as X–710, butadiene/styrene ratio 75/25; X–684, butadiene/styrene ratio 80/20; X–667, butadiene/styrene ratio 84/16; X–619, butadiene/styrene ratio 70/30; X–711 butadiene/styrene ratio 100/0.

Performance requirements of thickened liquid hydrocarbon fuels such as petroleum gasoline are exacting for most types of munitions which utilize them, particularly for flame throwers. Acceptable performance of the munitions in use requires that fuels have rod forming and temporary shape retaining characteristics for maximum distances after extruding, ejection and ignition. To satisfy the functional demands of the devices in which they are utilized, the thickened fuels must have rheological and viscoelastic properties adaptable to them.

The thickened fuels and also their ingredients should be stable under probable performance conditions. They should also be stable as nearly as possible in a temperature range such as −65° to +160° F.

Rapidly acting ingredients for thickening the hydrocarbon fuels on contact are desirable. Readily obtainable mixing equipment, such as a metal drum and paddle should preferably suffice for accomplishing the mixing. When using the thickening agents of the present invention, mixing may be accomplished with simple equipment. The thickening process starts immediately on contact of the ingredients.

According to the present invention, certain nonionic surface agents are employed to reduce the interfacial tension between hydrocarbon liquid fuels and the emulsoids of rubber latices, both synthetic and natural. A polyoxyethylene sorbitan trioleate vigorously promotes the gelling of hydrocarbon liquid fuels by synthetic and natural rubber latices. Performance tests of these thickened liquid fuels were satisfactory in munitions. However, the invention is not rigidly confined to this ester. In addition, a few other surface active agents, such as a polyoxyethylene sorbitan monooleate and a polyoxyethylene sorbitan dioleate are satisfactory.

Rubber latices when mixed with liquid hydrocarbons such as petroleum gasoline motor fuel do not form emulsions. Even after vigorous mechanical mixing and agitation, the latex drops out of the liquid hydrocarbon as a separate and distinct phase. We have discovered that when, for example, about 0.05 percent by weight of a polyoxyethylene sorbitan trioleate is mixed with the petroleum gasoline and then rubber latex added with mixing, thickening of the petroleum gasoline starts instantaneously. The rubber latices which we employ for such mixtures contain approximately 60 percent rubber solids.

The number of surface active agents which vigorously effect thickening of hydrocarbon liquid fuels by rubber latex is limited. Many surface active agents even in increased proportions and with vigorous mechanical mixing do not effect any emulsification at all. The hydrocarbon liquid and the latex remain two separately distinct phases with no apparent thickening of the fuel. Other surface active additives cause thickening of liquid hydrocarbon fuels to consistencies which are functionally less desirable. For example, they may be pasty and only slightly elastic in their consistencies.

The consistency of latex thickened liquid hydrocarbon fuel for a particular surface active agent which effects emulsification usually varies directly with the percentage of rubber solids in the mixture, but munitions performance considerations ordinarily limit the percentage of thickening additives in the fuel mixture. Minimum percentages of thermally inert additives such as rubber latices and surface active agents are preferable for efficient performance of thickened fuels in most munitions.

The rheological properties of petroleum gasoline thickened satisfactorily must conform to the requirements of munitions devices in performance tests. To numerically characterize consistencies of thickened petroleum gasolines, they are tested in a Gardner Mobilometer at approximately 77° F. The numerical values represent the weight in grams required to sink thru the gel a standard distance in 100 seconds. The numbers are indicative of the consistencies of the thickened liquid hydrocarbon fuel but are not interpreted directly in terms of performance value. They will serve to reject gels, but not to establish that they are satisfactory. They are abbreviated gc. In general, values of less than about 65 or more than about 700 indicate that the gel is unsatisfactory.

Gasoline may be thickened by natural latex plus certain salts and oxides, e.g., ammonium nitrate, ammonium silicofluoride, sodium silicofluoride, zinc acetate, copper acetate and magnesium oxide. The addition of certain surface active agents, e.g., polyoxyethylene tetraoleate increases the thickening rate of such combinations of agents and also makes it possible to utilize the combination of salts with synthetic latices. In the absence of the surface active agent, the combination of salt and synthetic latex does not gel gasoline. However, gelled gasolines of this type are not satisfactory for use in flame throwers due to poor rheological and viscoelastic properties. They also have poor stability in storage.

In contrast, gasoline gelled by natural or synthetic latex together with a surface agent of our restricted group, in the absence of salts, shows excellent performance and storage characteristics.

The following experimental examples contrast the results obtained by the composition of our invention with the unsatisfactory results obtained by apparently similar formulations.

Petroleum gasoline, thickened according to formulations of example 1 was not satisfactory in munitions devices when tested for performance. It was a pasty mixture lacking in elasticity and exhibiting unsatisfactory firing qualities when used in a portable flame thrower.

EXAMPLE 1

|  | % | % |
|---|---|---|
| Petroleum gasoline | 89.0 | 87.5 |
| Nonionic polyoxyethylene tetraoleate | 0.6 | 0.6 |
| Synthetic rubber latex X–711, butadiene/styrene 100/0 (60.8% rubber solids) | 9.5 | 11.0 |
| Zinc acetate dehydrate micropulverized | 0.9 | 0.9 |
| GC after 1 day | 25 | 60 |

Petroleum gasoline thickened according to formulations of example 2 successfully passes performance tests in munitions devices. The surface active agent, a polyoxyethylene sorbitan trioleate, and a polybutadiene synthetic rubber latex were the thickening agents. A formulation with natural rubber latex is also given.

EXAMPLE 2

| A. (Synthetic latex) | % | |
|---|---|---|
| Petroleum gasoline | 89.0 | 89.4 |
| Nonionic polyoxyethylene sorbitan trioleate | 1.0 | 1.0 |
| Synthetic rubber latex X-711 butadiene/styrene | | |
| 100/0-solids 60.3% | 10.0 | — |
| -solids 62.5% | | 9.6 |
| GC after 3 days | 66 | 96 |
| GC after 5 days | 90 | — |

| B. (Natural latex) | % |
|---|---|
| Petroleum gasoline | 92.5 |
| Nonionic polyoxyethylene sorbitan trioleate | 1.0 |
| Natural rubber latex, solids 61.5% | 6.5 |
| GC after 5 days | 110 |

Petroleum gasoline thickened according to formulations of example 3 and 3a were of a comparatively low order of stability under the storage temperature and therefore unsatisfactory for many uses.

EXAMPLE 3

| | % | % |
|---|---|---|
| Storage temperature +160° F. | | |
| Petroleum gasoline | 90.2 | 85.8 |
| Cationic, stearyl dimethyl benzyl ammonium chloride | 0.5 | 1.0 |
| Synthetic rubber latex, X-711 butadiene/styrene 100/0, 60.8% rubber solids | 9.3 | 13.2 |

Separation of liquid or syneresis occurred when petroleum gasoline samples were thickened according to these formulations and stored at +160° F.

EXAMPLE 3a

| | % | % |
|---|---|---|
| Storage temperature range +68° to +95° F. | | |
| Natural rubber latex 60% rubber solids | 8.4 | 8.0 |
| Petroleum gasoline | 90.6 | 90.5 |
| Ammonium nitrate pulverized | 1.0 | — |
| Nonionic polyoxyethylene sorbitan monoleate | — | 0.05 |
| Zinc acetate dehydrate pulverized | — | 1.0 |

Petroleum gasoline thickened according to these formulations, becomes thin when stored in the temperature range +68° to +95° F. for less than 2 months.

Petroleum gasoline thickened according to formulations of example 4 and 4a were stable under the storage temperatures +68° to +95° F. The surface active agent for example 4 was polyoxyethylene sorbitan trioleate and for example 4a it was polyoxyethylene sorbitan monooleate.

EXAMPLE 4

| | | a | b | c | d | e |
|---|---|---|---|---|---|---|
| Petroleum gasoline | % | 90.2 | 86.7 | 86.4 | 86.2 | 85.0 |
| Polyoxyethylene sorbitan trioleate | % | 0.5 | 0.2 | 0.5 | 0.7 | 0.2 |
| Synthetic rubber latex X-711 butadiene/styrene 100/0 60.8% solids | | 9.3 | 13.1 | 13.1 | 13.1 | 14.8 |

EXAMPLE 4a

| | | | | |
|---|---|---|---|---|
| Petroleum gasoline | % | 85.9 | 85.4 | 84.2 |
| Polyoxyethylene sorbitan monooleate | % | 1.0 | 1.5 | 1.0 |
| Synthetic rubber latex X-711 butadiene/styrene 100/0 60.8% solids | % | 13.1 | 13.1 | 14.8 |

In example 5 the Gardner mobilometer consistency (GC) numbers of thickened petroleum gasoline are compared. For the same conditions, GC numbers of about 65 or over indicate acceptably efficient surface active agent. One percent of surface active agent was added to each fuel mixture.

EXAMPLE 5

| Synthetic rubber latex | B/S ratio | Fuel mixture rubber solids, percent | Thickened fuel test age, days | Surface active agent | GC, g./100 sec. |
|---|---|---|---|---|---|
| X-684 | 80/20 | 7 | 14 | Non-ionic polyoxyethylene sorbitan trioleate. | 80 |
| X-667 | 84/16 | 7 | 3 | Cationic di Coco* dimethyl ammonium chloride. | 47 |
| X-684 | 80/20 | 7 | 14 | Non-ionic polyoxyethylene sorbitan tetraoleate. | <25 |
| X-667 | 84/16 | 7 | 3 | Non-ionic polyoxyethylene sorbitan trioleate. | 100 |
| X-684 | 80/20 | 7 | 14 | Cationic di Coco* dimethyl ammonium chloride. | <25 |
| X-711 | 100/0 | 7 | 14 | Non-ionic polyoxyethylene sorbitan monooleate. | 144 |

*Mixed alkyl radicals corresponding to those in coconut oil.

In Example 6, are given GC numbers of petroleum gasoline thickened according to the formulation, petroleum gasoline 86.2, surface active agents 1, and synthetic rubber latex X-711 B/S: 100/0 (solids 62.5), 12.8 parts. The thickened fuels were 6 days old when tested. This comparison shows the efficiency of the oxyethylated sorbitan oleates in the thickening process.

EXAMPLE 6

| Surface-active agent | GC g./100 sec. |
|---|---|
| Polyoxyethylene sorbitan: | |
| Monooleate | 410 |
| Dioleate | 420 |
| Trioleate | 650 |

Example 7 shows the relative thickening of liquid hydrocarbons according to the formation, liquid hydrocarbons 89, polyoxyethylene sorbitan trioleate 1, synthetic rubber latex X-711 B/S-100/0, (solids 60.35), 10 parts,

EXAMPLE 7

| Hydrocarbon liquid fuels | GC g./100 sec. |
|---|---|
| Heptane | 34 |
| Petroleum gasoline | 75 |
| Cyclohexene | 110 |
| Benzene | 160 |

According to another aspect of the present invention, we have found that the temperature range in which rubber latex retains fluidity may be broadened by the use of pour point depressants in the latex. The optimum quantity of depressant is specific for a particular compound. It is limited by practical considerations in the use of the latex.

The pour point of natural rubber latex is decreased by mixing ethylene glycol or glycerine with the latex. Twenty percent by weight of ethylene glycol decreases the pour point by 65° F. Glycerine has unique stabilizing properties, as will be pointed out below. Amides such as formamide are also effective as pour point depressants for natural rubber latex. Ethylene glycol is not, however, suitable for use with synthetic latices.

Mixed with a synthetic rubber latex, such as X-711 B/S-1000, 23 percent by weight of formamide decreases the pour point of the latex by 47° F. Twenty percent by weight of glycerine in the synthetic latex mixture decreases the pour point by 30° F. and, as in the case of natural latex, produces freeze-thaw stabilization.

According to the present invention, petroleum gasoline may be thickened by certain polyoxyethylene sorbitan oleates and natural rubber latex which has been mixed with a pour point depressant such as ethylene glycol, glycol mixtures, glycerine or formamide. Such pour point depressants may partially replace natural latex water content.

Petroleum gasoline may be also thickened by certain polyoxyethylene sorbitan oleates and a synthetic rubber latex such as X-711, B/S-100/0 which has been mixed with an amide pour point depressant, such as formamide, or with glycerine. As in the case of natural latex, such pour point depressant may replace part of the synthetic latex water content.

EXAMPLE 8

| Synthetic rubber latex X-711 | Pour Point ° F. | Freezing Point ° F. |
|---|---|---|
| Latex composition | | |
| X-711 | +37 | +18 |
| X-711+20% by wt. ethylene glycol | +28 | |
| X-711+28.6% by wt. Sorbo (or 20% D-Sorbitol) | +25 | |
| X-711+21.8% by wt. glycerine | +5 | |
| X-711+28.6% by wt. formamide | -10 | |

EXAMPLE 9

X-711 +16-21 percent by weight of ethylene glycol at 0° F. for 2 months, solid. Thawed at room temperature the latex was irreversibly denatured, i.e., so changed in its physical state as to be useless. The same result with ethylene glycol was obtained at -40° and -65° F.

EXAMPLE 10 (comparison)

X-711, latex was prepared to contain 16.7, 28.6 and 37.4 percent of "Sorbo" (a 70 percent solution of D-Sorbitol in water). The mixtures were stored for 11 days.

| Temp. ° F. | | |
|---|---|---|
| 0 | Solid | Thawed at room temperature. Irreversibly denatured to rubbery mass. |
| -40 | Solid | |

Results at -65° F. were the same as for -40° F.

EXAMPLE 11

Synthetic Rubber Latex X-711 Plus Formamide

Mixtures of X-711 and formamide prepared to contain 16.7, 25.4, 28.5 and 37.7 percent of formamide after 5 weeks at -25° F. were flowable.

The mixture with 16.7 percent formamide froze solid after 5 weeks at -40° F. and remained solid. Mixtures with 25.4 and 28.5 percent of formamide after 5 weeks at -40° F. were flowable, but there was slight coagulation. The 28.5 percent mixture of formamide and synthetic latex X-711 was liquid after 1 year at -40° F. The 37.7 percent mixture of formamide and X-711 latex was liquid after 1 year at -40° F. and there was no evidence of coagulation.

Stored at -65° F., for 1 week, mixtures of X-711 latex with 16.7, 25.4, 28.5 and 37.7 percent of formamide were frozen solid and irreversibly denatured.

EXAMPLE 12

After storage at -40° F. for 3 weeks a mixture of X-711 latex prepared to contain 37.5 percent of formamide was flowable. This mixture and other similar mixtures were used to prepare gasoline gels. This example illustrates such formulations.

| | % by weight |
|---|---|
| X-711 containing 37.5% formamide | 21.3 |
| Gasoline | 77.7 |
| Tween 85 (polyoxyethylene sorbitan trioleate) | 1.0 |

After 1 day, the result of a Gardner Consistency test was 225 grams per 100 seconds.

After storage at -25° F. for 10 days and 0° F. for 10 days a mixture of X-711 latex containing 37.5 of formamide was used in the following gel formulation.

| | % |
|---|---|
| X-711 with 37.5% of formamide | 18.6 |
| Gasoline | 80.4 |
| Polyoxyethylene sorbitan trioleate | 1.0 |

After 1 day, the result of a Gardner consistency test was 100 grams per 100 seconds.

EXAMPLE 13

X-711 Synthetic Rubber Latex Plus Glycerine

Mixtures of X-711 prepared to contain 21.8 percent of glycerine by weight froze solid at -65° F. but when thawed at room temperature were visually unaffected and not changed.

At 0° F. for 2 months mixtures of X-711 with 16.6 and 19.6 percent by weight of glycerine froze solid, but when thawed at room temperature were unchanged.

At -40° and -65° F. for 2 months mixtures of X-711 with 21.8 percent by weight of glycerine froze solid, but when thawed at room temperature was unchanged.

The following examples 14 and 15 illustrate the use of glycerine with natural latex. Glycerine is shown to be less effective than glycol as a pour point depressant, but outstanding as a freeze-thaw stabilizer.

EXAMPLE 14

Natural Rubber Latex, Centrifuged Ammoniated

| Latex Composition | Pour Point ° F. |
|---|---|
| Nat. R. Latex | +35 |
| Nat. R. Latex + 20% by wt. of Ethylene Glycol | -30 |
| Nat. R. Latex + 21.8% by wt. of Glycerine | -5 |

EXAMPLE 15

At 0° F. Natural rubber latex prepared to contain 16.6 percent by weight of glycerine froze solid but on thawing at room temperature after 2 months at 0 F. was unchanged.

At -65° F. and -40° F. after 2 months natural rubber latex prepared to contain 21.8 percent by weight of glycerine froze solid but on thawing at room temperature was unchanged.

EXAMPLE 16

Synthetic rubber latex X-711 with which 20 percent by weight of glycerine was mixed, and which then contained 47 percent of rubber solids was aged at -65° F. for 2 days, then removed and thawed at ambient temperatures of about +75° F. This treatment was repeated for about 15 times over a period of about 45 days. The mixture solidifies at -65° F. but when thawed at about -75° F. returns to its original state apparently unchanged and not denatured.

EXAMPLE 17

Latex X-711 was prepared to contain 20 percent by weight of glycerine. This was stored at -65° F. for 2 days. The solid mixture was removed and kept at about +75° F. for a few hours until thawed to free flowing liquid. This freeze-thaw cycle was repeated about 15 times. Gasoline was thickened by synthetic latex X-711 which has been treated as described. The formulation and Gardner mobilometer consistencies of the gel were as follows:

| Rubber solids, percent | Formulation | Wt. percent | Consistency Gardner Mobilometer at +72° F., grams/100 sec. |
| --- | --- | --- | --- |
| 8 | X-711 plus 20% glycerine | 16.5 | 90 |
|   | Gasoline, auto., Q.M. grade | 82.5 |   |
|   | Polyoxyethylene sorbitan trioleate | 1.0 |   |
| 9 | X-711 plus 20% glycerine | 18.5 | 180 |
|   | Gasoline, auto., Q.M. grade | 80.5 |   |
|   | Polyoxyethylene sorbitan trioleate | 1.0 |   |

Thus, glycerine is a protective agent for synthetic rubber latex subjected to temperatures such as −65° F.

The surface active agent, such as polyoxyethylene sorbitan trioleate, may be made a constituent of the hydrocarbon liquid as in manufacture or by mixing. As such, the hydrocarbon liquid surface active agent might be stored. The agent may also be mixed with the hydrocarbon liquid just prior to or during the thickening process.

The quantity of surface agent in the system hydrocarbon liquid-latex may be varied in the range of about 0.05 to 1.5 percent. However, 1 percent by weight of surface active agent is commonly used and is preferred.

The rubber solids content of latices should preferably be not less than 60 percent by weight. The synthetic rubber latices which were employed to thicken hydrocarbon liquids in the presence of the surface active agents as shown in examples 2, 4, 5 were produced by emulsion "cold rubber" processes. The quantity of rubber latex used in the process may be varied to give from 3 to 17 percent and higher rubber solids. However 5-7 percent rubber solids content in thickened hydrocarbon liquid fuels is preferred, particularly for flame thrower fuels.

Thickened hydrocarbon liquid fuels prepared by such formulations as example 4 may be fired from munitions devices, e.g., flame throwers, about 1 day after mixing, although storage at −65° F. does not affect them and only slight syneresis occurs when they are stored at +160° F. for 6 months.

Mixing operations necessary for thickening liquid hydrocarbon fuel formulations in the above examples may be readily accomplished manually by such ordinary equipment as a container and paddle. The reactive speed of the ingredients and simplicity of the thickening process of the present invention are of outstanding advantage in mixing operations.

Mixing may be accomplished at temperatures in the range of fluidity of the latices. As disclosed above the temperature range of fluidity of natural latex may be broadened by incorporating suitable pour point depressants.

Hydrocarbon liquid fuels such as petroleum gasoline are thickened by latices, natural and synthetic, prepared to contain pour point depressants by the procedures used for natural and synthetic latices which do not contain pour point depressants. Adjustments must be made for differences in rubber solids content of petroleum gasoline thickening mixtures when pour point depressants have been added to the latices. Otherwise the thickening process is the same as for examples cited. To the liquid hydrocarbon fuel containing the required quantity of surface active agent such as a polyoxyethylene sorbitan trioleate is added with mixing, the required quantity of latex natural or synthetic containing pour point depressant such as those described.

In addition to meeting the exacting requirements for flame throwers fuels, the gels of our invention may also be used for other related uses, e.g., in incendiary bombs, flares, signals and fireworks. They may also be used in adhesive, waterproofing and paint base compositions. Their specific advantages are, however directed to their use as flame thrower fuel.

We claim:
1. A flame thrower fuel consisting essentially of gasoline, natural rubber latex about 0.05 to 1.5 percent by weight of a nonionic surface active agent selected from the group consisting of polyoxyethylene sorbitan trioleate, polyoxyethylene sorbitan dioleate and polyoxyethylene sorbitan monooleate, and from 15 to 40 percent by weight of the said latex of a pour point depressant selected from the group consisting of ethylene glycol, glycerine and formamide said latex having not less than 60 percent by weight of rubber solids, in such quantity that the rubber solids content of the said fuel is 3 to 17 percent by weight.

* * * * *